United States Patent
Bilinski et al.

(10) Patent No.: US 9,177,332 B1
(45) Date of Patent: Nov. 3, 2015

(54) MANAGING MEDIA LIBRARY MERCHANDISING PROMOTIONS

(71) Applicant: Google Inc., Mountain View, CA (US)

(72) Inventors: Brandon Bilinski, San Francisco, CA (US); Curtis Glenn Hawthorne, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 53 days.

(21) Appl. No.: 13/665,900

(22) Filed: Oct. 31, 2012

(51) Int. Cl.
   *G06Q 30/00* (2012.01)
   *G06Q 30/02* (2012.01)

(52) U.S. Cl.
   CPC .................. *G06Q 30/0271* (2013.01)

(58) Field of Classification Search
   None
   See application file for complete search history.

(56) References Cited

U.S. PATENT DOCUMENTS

| | | | | |
|---|---|---|---|---|
| 7,035,811 | B2* | 4/2006 | Gorenstein | 705/7.33 |
| 7,366,682 | B1* | 4/2008 | Katiyar et al. | 705/14.51 |
| 7,814,102 | B2* | 10/2010 | Miller | 707/736 |
| 7,877,387 | B2* | 1/2011 | Hangartner | 707/736 |
| 8,027,876 | B2* | 9/2011 | Taylor | 705/14.49 |
| 8,185,431 | B2* | 5/2012 | Abboa-Offei | 705/7.31 |
| 8,230,037 | B2 | 7/2012 | Story et al. | |
| 8,281,037 | B2* | 10/2012 | Julia et al. | 709/249 |
| 8,321,267 | B2* | 11/2012 | Hoerenz | 705/14.1 |
| 2001/0014876 | A1* | 8/2001 | Miyashita | 705/37 |
| 2005/0010472 | A1* | 1/2005 | Quatse et al. | 705/14 |
| 2005/0021397 | A1* | 1/2005 | Cui et al. | 705/14 |
| 2005/0021398 | A1* | 1/2005 | McCleskey et al. | 705/14 |
| 2005/0033700 | A1* | 2/2005 | Vogler et al. | 705/57 |
| 2005/0289000 | A1* | 12/2005 | Chiang et al. | 705/14 |
| 2007/0061195 | A1* | 3/2007 | Liu et al. | 705/14 |
| 2007/0129993 | A1* | 6/2007 | Alvin | 705/10 |
| 2007/0162337 | A1* | 7/2007 | Hawkins et al. | 705/14 |
| 2008/0172288 | A1* | 7/2008 | Pilskalns et al. | 705/10 |
| 2008/0214148 | A1 | 9/2008 | Ramer et al. | |
| 2008/0249876 | A1* | 10/2008 | Rice et al. | 705/14 |
| 2008/0281790 | A1* | 11/2008 | Prosser et al. | 707/3 |
| 2008/0300981 | A1* | 12/2008 | Crites et al. | 705/14 |
| 2009/0076884 | A1* | 3/2009 | Johnson et al. | 705/10 |
| 2009/0216622 | A1* | 8/2009 | Hoashi et al. | 705/10 |
| 2009/0292612 | A1* | 11/2009 | Van De Sluis et al. | 705/14.53 |
| 2010/0082419 | A1* | 4/2010 | Au-Yeung et al. | 705/14.19 |
| 2010/0312639 | A1* | 12/2010 | Mastronardi | 705/14.48 |
| 2011/0196871 | A1* | 8/2011 | Kilroy et al. | 707/740 |
| 2011/0218850 | A1 | 9/2011 | Kaufman et al. | |
| 2012/0215639 | A1 | 8/2012 | Ramer et al. | |
| 2012/0226563 | A1* | 9/2012 | Lu et al. | 705/14.66 |
| 2012/0240165 | A1* | 9/2012 | Pan | 725/42 |

* cited by examiner

*Primary Examiner* — John G Weiss
*Assistant Examiner* — Meredith A Long
(74) *Attorney, Agent, or Firm* — Morris & Kamlay LLP

(57) ABSTRACT

A method and/or system for managing media library merchandising promotions may include determining one or more current promotions from a plurality of promotions. A universal score may be assigned to each of the one or more current promotions, wherein the universal score is updated dynamically based on interactions with the one or more current promotions by one or more users. A personal score for each of the one or more current promotions may be assigned for a particular user, wherein the personal score is updated dynamically based on interactions with the one or more current promotions by the particular user. Personalized digital content promotions may be determined for the particular user from the current promotions based on the personal score and/or the universal score. The personalized promotions may be presented to the particular user.

15 Claims, 4 Drawing Sheets

MANAGING MEDIA LIBRARY MERCHANDISING PROMOTIONS

TECHNICAL FIELD

Aspects of the present application relate to promoting digital media content. More specifically, certain implementations of the present disclosure relate to managing media library merchandising promotions.

BACKGROUND

Digital media merchandising promotions are broadly advertised to users regardless of whether the users are interested in the content of the promotions. The traditional algorithmic presentation of the promotions is inefficient in generating sales of the promoted content. There exists a need of presenting to users digital media merchandising promotions that the users are interested in.

Further limitations and disadvantages of conventional and traditional approaches will become apparent to one of skill in the art, through comparison of such approaches with some aspects of the present method and/or system set forth in the remainder of this disclosure with reference to the drawings.

BRIEF SUMMARY

Method and/or system for managing media library merchandising promotions, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
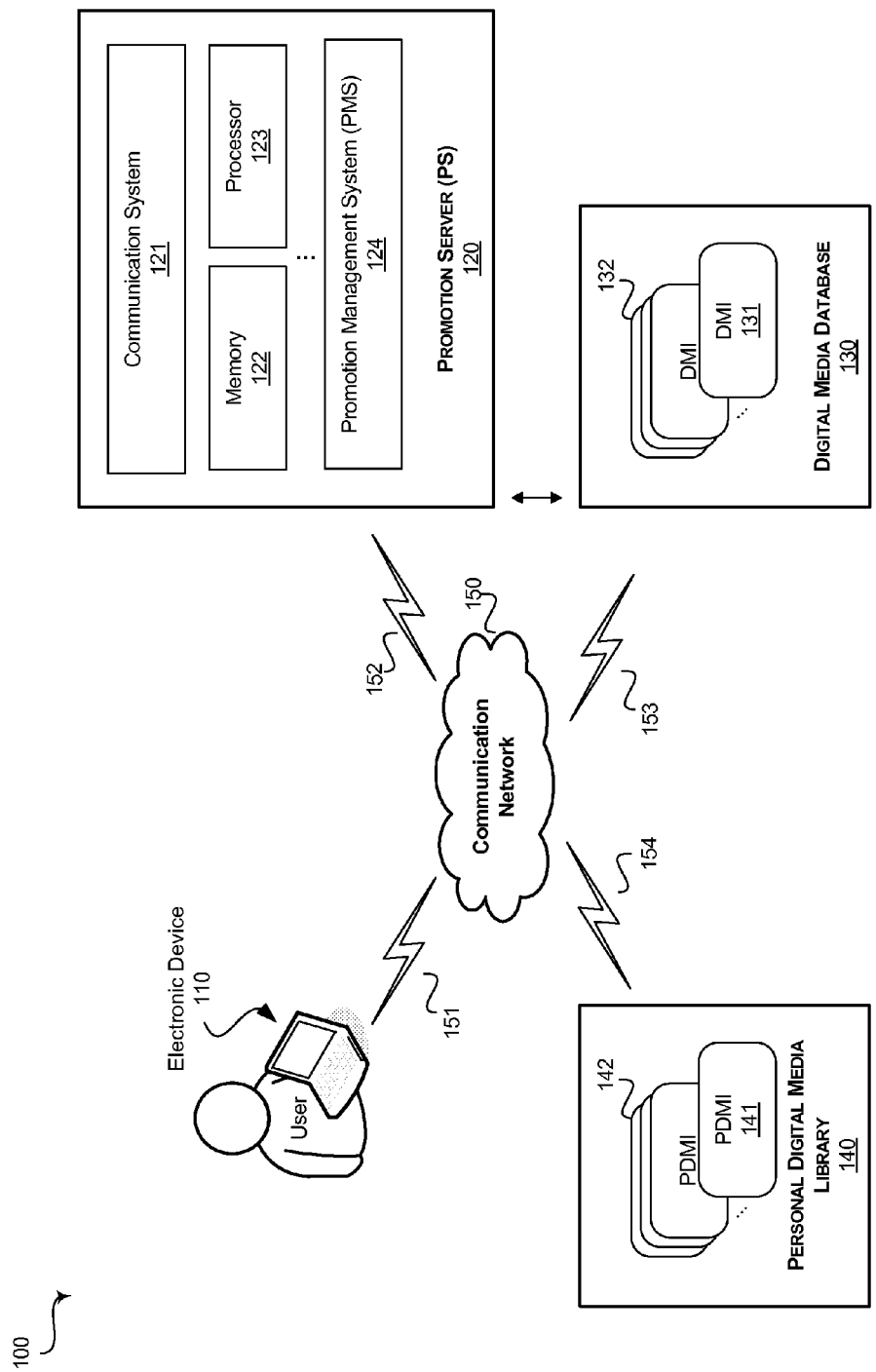
FIG. 1 is a block diagram of an example system for managing media library merchandising promotions, in accordance with an example embodiment of the disclosure.

Certain embodiments of the disclosure may be found in a method and/or system for managing media library merchandising promotions. In various embodiments of the disclosure, a method and/or system for managing media library merchandising promotions may include determining one or more current promotions from a plurality of promotions. Popularity of one or more digital media items associated with each of the one or more current promotions may be determined. A universal score may be assigned to each of the one or more current promotions, wherein the universal score may be updated dynamically based on interactions with the one or more current promotions by one or more users. The universal score may be based on popularity of the one or more digital media items. One or more digital media items associated with at least some of the one or more current promotions may be matched with one or more personal digital media items associated with a personal media library associated with the particular user. A correlation score may be assigned to the one or more digital media items associated with at least some of the one or more current promotions matched with one or more personal digital media items. Personal digital media items associated with the personal media library may be grouped based on a category of one or more digital media items associated with at least some of the one or more current promotions to obtain one or more groups. The size of each of the groups may be determined. A personal score, corresponding to a particular user, for each of the one or more current promotions may be assigned, wherein the personal score may be updated dynamically based on interactions with the one or more current promotions by the particular user. The personal score may be based on the particular user's activity with respect to a personal media library associated with the particular user. The personal score may be based on the correlation score and/or on the size of at least some of the one or more groups. Personalized digital content promotions may be determined for the particular user from the current promotions based on the personal score of at least some of the one or more current promotions and/or the universal score of at least some of the one or more current promotions. Information regarding the personalized digital content promotions may be transmitted to an electronic device associated with the particular user.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or." As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, terms "block" and/or "module" refer to functions, processes, threads, etc. than can be performed by one or more circuits. As utilized herein, the term "e.g.," introduces a list of one or more non-limiting examples, instances, or illustrations. As utilized herein, the term "server" may refer to a plurality of machines, at least some of which may be installed in different locations, and each of which may be utilized to implement distinct and/or redundant functions associated with operations attributed to and/or performed by the server.

As used herein the term "digital media" and/or "digital media item" may comprise any discrete media object, such as streaming media, audio files, video files, books, magazines, articles, games, slide shows, camera captures, and the like. Such "digital media" and/or "digital media item" may be operable to be played back, displayed, and/or otherwise rendered for user consumption. The "digital media" and/or "digital media item" may comprise an audio and/or video content and/or any suitable digital media content (e.g., AAC, AC3, AEH (ArchosReader), AVI, BBeB (SonyMedia), Complied HTML, DV, Eveda, Flash, KF8, LIT, MIDI, MobiPocket, MPEG, MP3, MP4, PalmMedia, RealAudio, RealVideo, Shockwave, WaveForm, QuickTime).

FIG. 1 is a block diagram of an example system for managing media library merchandising promotions, in accordance with an example embodiment of the disclosure. Referring to FIG. 1, there is shown a system for managing media library merchandising promotions 100. The system 100 may comprise an electronic device 110, a promotion server (PS) 120, a digital media database 130, a personal digital media library (PDML) 140, a network 150, and a plurality of wired and/or wireless links 151-154 for communicating over the network 150.

The electronic device 110 may comprise suitable logic, circuitry, interfaces, and/or code that may be operable to communicate data and/or messages via wired and/or wireless connections configured in accordance with one or more supported wireless and or wired protocols, standards and/or interfaces (e.g. Ethernet, Bluetooth, WiFi, cellular, WiMAX, WLAN, NFC). The electronic device 110 may be operable to process, generate, present and/or output data and/or messages. The electronic device 110 may be enabled to perform, run, and/or execute various functions, operations, applications and/or programs based on, for example, user instructions and/or interactions, and/or pre-configured instructions. In this regard, the electronic device 110 may be operable to communicate, for example, with the promotion server 120 the digital media database 130 and/or the personal digital media library 140. For example, the electronic device 110 may be enabled to receive one or more digital media items, such as for example, the DMIs 132 and/or PDMIs 142. The electronic device 110 may be operable to render and/or format the DMIs 132 and/or the PDMIs 142 for consumption by a user of the electronic device 110. For example, the electronic device 110 may receive, process and/or present the DMIs 132 and/or the PDMIs 142 to the user as part of services provided by a promotion server, such as, for example, the promotion server 120.

The electronic device 110 may be operable to run applications that incorporate and/or are operable to access a personal digital media library, such as, for example, the personal digital media library 140. In this regard the electronic device 110 may be operable to provide the user of the electronic device 110 with access to the personal digital media library 140. The electronic device 110 may be operable to detect user interactions (e.g., playing, purchasing, organizing content) with the PDML 140. In an example embodiment of the disclosure, the electronic device 110 may, in response to, for example, the user interactions with the PDML 140, be operable to request, receive and/or process requests, notifications, data and/or information relating to managing and/or presenting digital content promotions to the user of the electronic device 110 through, for example, a graphical user interface (GUI). The GUI may be operable to present, to the user, contents of the PDML 140 and/or the digital content promotions received by the electronic device 110 in response to user's interactions with the PDML 140.

The electronic device 110 may comprise a cellular phone, smartphone, tablet, set-top box, television, laptop computer, desktop and/or personal computer, personal media player, other device which may communicate, process, generate, present and/or output data and/or other device that supports consumption of digital media. The disclosure, and/or any implementation(s) in accordance therewith, however, are not limited to any particular type of electronic devices.

The promotion server (PS) 120 may comprise suitable logic, circuitry, code, and/or interfaces that may be operable to provide digital media services to electronic devices, such as for example, the electronic device 110. For example, the promotion server 120 may be enabled to provide digital media storage services, digital media management services, subscription services (e.g., streaming digital media subscription services), digital media provisioning services (e.g., selling, transcoding and/or downloading digital media) and/or digital media promotion services (e.g., creating, managing, processing and/or presenting digital media content promotions). The promotion server 120 may, for example, comprise a communication system 121, a memory/storage 122, a processor 123 and/or a promotion management system (PMS) 124.

In an example embodiment of the disclosure, the PS 120 may receive, store, manage and/or process data and/or information relating to digital media play, purchasing, and/or promoting history per user, electronic device and/or a personal digital media library or in the aggregate (e.g., statistical and anonymous aggregate data collection, processing and management).

Even though the promotion server 120 is illustrated as being separate from the electronic device 110, the disclosure may not be limited in this regard. More specifically, the promotion server 120 may be implemented as part of an electronic device, such as for example the electronic device 110.

The communication system 121 may comprise suitable logic, circuitry, code, and/or interfaces that may be operable to provide communication services to and from the electronic device 110, the digital media database 130 and/or the personal digital media library 140. For example, the communication system 121 may include one or more transceivers for providing wired and/or wireless communication of data to and from the electronic device 110, the digital media database 130 and/or the personal digital media library 140 via the communication network 150 and/or one or more of the communication links 151, 152, 153 and/or 154.

The memory/storage 122 may comprise suitable logic, circuitry, code, and/or interfaces that may be operable to enable storage of data and/or other information utilized by one or more of the components of the promotion server 120, such as for example, the communication system 121, the processor 123 and/or the PMS 124. The memory/storage 122 may be enabled to store executable instructions to manage and/or configure, for example, the communication system 121, the processor 123 and/or the PMS 124. The memory/storage 122 may comprise RAM, ROM, low latency nonvolatile memory such as flash memory and/or other suitable electronic data storage capable of storing data and/or information. The memory may comprise various database, such as, for example, a promotion database as depicted in and/or described with respect to FIG. 2.

The processor 123 may comprise suitable logic, circuitry, code, and/or interfaces that may be operable to support communication services, digital media streaming, subscription, provision and/or promotion services. The processor 123 may manage and/or control operation of the components of promotion server 120, such as for example, the communication system 121, the memory/storage 122 and/or the PMS 124.

The PMS 124 may comprise suitable logic, circuitry, code, and/or interfaces that may be operable to create, manage and/or serve (e.g., present or cause to be presented) digital content promotions. The PMS 124 may comprise a creation platform, a scoring platform and/or a serving platform as depicted in and/or described with respect to FIG. 2. The PMS 124 may be operable to create digital content promotions relating to digital media items, such as for example, digital media items 132. In that respect. The PMS 124 may provide promotion creation services comprising enabling tools for selecting digital content for promoting and/or defining various criteria associated with such promotion (e.g., category, duration, priority and/or graphical (audio, video and/or still image) representation). The PMS 124 may provide promotion scoring services. For example, the PMS 124 may be operable to determine, calculate, update and/or assign a personal and/or a universal score to a digital content promotion based on a variety of criteria (e.g., interactions with and/or purchasing of the content of the promotions). The PMS 124 may provide promotion serving services. In this regard, the PMS 124 may receive and/or process a notification and/or request to serve and/or present personalized digital content promotions. In response to the notification and/or request, the PMS may determine the personalized digital content promotions to be served and/or presented based on, for example, the personal and or the universal score as determined by the scoring services provided by the PMS 124.

The components of the promotion server 120, such as for example, the communication system 121, memory/storage 122, the processor 123 and/or the PMS 124 may be implemented in an integrated or a distributed system. An integrated system may be implemented, for example, on one computer, server, machine or device, where the integrated system may be configured to perform some or all of the functions, features and/or operations of the communication system 121, memory/storage 122, the processor 123 and/or the PMS 124 as described herein. A distributed system may be implemented with multiple components (e.g., computers, servers, machines and/or devices), where each of the multiple components may be configured to perform some or all of the functions, features and/or operations of the communication system 121, memory/storage 122, the processor 123 and/or the PMS 124 as described herein. Each function, feature and/or operation may be implemented on one or more of the components of the distributed system. For example, a specific feature, function and/or operation may be implemented by only one component of the distributed system or it may be implemented across multiple components of the distributed system.

The digital media database 130 may comprise suitable logic, circuitry, code, and/or interfaces that may be operable to store and/or manage a plurality of digital media items (DMIs) 132. In this regard, the digital media database 130 may be operable to store and/or manage the plurality of DMIs 132, digital playlists comprising one or more of the plurality of the DMIs 132 and/or a play order. The digital media database 130 may store and/or manage data and/or information about the correlation of the DMIs 132 with respect of each other (or store and/or manage correlations score). In that respect, the DMIs 132 may, for example, comprise music items such as, for example, songs and video. The digital media database 130 may be operable to store and/or manage a correlation of, for example, a song to one or more songs and/or group of songs (album, some or all songs by a certain artist, some or all songs of the same or similar genre). For example, songs by a common artist and/or of the same or similar genres may have a high correlations score, while songs of very different genres may have a low correlations score. The digital media library 130 may store and/or manage correlation for some or all of the DMIs 132 with respect to some or all remaining DMIs 132. The correlations may be grouped and/or organized by a song, artist, album, genre, other suitable criteria and/or any combination thereof. For example, an album comprising a plurality of songs may have a correlations score assigned for, for example, individual songs that are not a part of that album and/or a correlations score for other albums and/or for other genres. The correlation between the DMIs 132 may be many-to-many and/or multi-dimensional. For example, Song A, which is a part of Album B, and is by Artist C may have correlations scores assigned for Songs D, E, F, Albums G, H, I and Genres J, K, L. Also, Album B (which includes song A) may have separate correlation scores assigned for Songs D, E, F, Albums G, H, I and Genres J, K, L. Artist C (which is inherently related both to Song A and Album B) may have separate correlation scores assigned for Songs D, E, F, Albums G, H, I and genres J, K, L. The respective correlations scores of Song A, Album B and/or Artist C may be the same or different for each of the Songs D, E, F, Albums G, H, I and Genres J, K, L. As another example, every song, album, artist and/or genre may have a correlations score assigned for any other song, album, artist and/or genre.

Even though the digital media database 130 is illustrated as being separate from the promotion server 120, the disclosure may not be limited in this regard. More specifically, the digital media database 130 may be implemented as part of the promotion server 120.

The personal digital media library (PDML) 140 may comprise suitable logic, circuitry, code, and/or interfaces that may be operable to store and/or manage a plurality of digital media items (PDMIs) 142. In this regard, the personal digital media library 140 may be operable to store and/or manage the plurality of PDMIs 142, digital playlists comprising one or more of the plurality of the PDMIs 142 and/or a play order. The PDML 140 may store and/or manage play, purchase and/or interaction history with the PDMIs 142. Even though the personal digital media library 140 is illustrated as being separate from the electronic device 110, the disclosure may not be limited in this regard. More specifically, the personal digital media library 140 may be implemented as part of the electronic device 110. Even though the personal digital media library 140 is illustrated as being separate from the promotion server 120, the disclosure may not be limited in this regard. More specifically the personal digital media library 140 may be, for example, hosted in a cloud based storage provided, managed and/or supported by the promotion server 120 and/or may be accessible to a user associated with the personal digital medial library 140 from any electronic device, such as, for example, the electronic device 110.

The communication network 150 may comprise any combination of wired and/or wireless protocols, standards and/or interfaces (e.g. Ethernet, Bluetooth, WiFi, satellite and/or cellular network, WiMAX, WLAN, NFC) that enable communication between electronic devices, such as, for example, the electronic device 110, the promotion server 120, the digital media database 130 and/or the personal digital media library 140.

In an example embodiment of the disclosure the system 100 may present to a user of an electronic device, such as, for example, the electronic device 110, one or more personalized promotions. In this regard, the PS 120 may receive a notification and/or request from the electronic device 110 to supply and/or update personalized promotions for the electronic device 110. The notification and/or request may be sent from the electronic device 110 to the PS 120, when, for example, the user of the electronic device 110 access a personal digital media library, such as, for example, the PDML 140. The PS 120 may receive and/or process the notification and/or request. In this regard, the PS 120 may determine current digital content promotions. The PS 120 may determine a universal score for each of the current digital content promotions based on, for example, popularity of the digital content, user interactions with the digital content, digital content purchases and/or other information indicative of relative popularity of the digital content among users of the services provided by the PS 120. The PS 120 may determine a personal score for each of the current promotions based on, for example, the contents on the PDML 140, use and/or play history associated with the PDML 140 and/or other information indicative of the preferences of the user of the PDML 140 as they relate to the current digital content promotions. The PS 120 may determine personalized digital content promotions from the current digital content promotions based on, for example on the personal and/or the universal score of each of the current promotions.

In an example embodiment of the disclosure, the PS 120 may determine personalized digital content promotions based on, for example, the interactions of the user of the PDML 140 with the current digital content promotions. For example, when the user of the electronic device 110 access the PDML 140, the PS 120 may determine and/or present (or cause to be presented) to the user an initial set of personalized digital content promotions comprising, for example Promotion A, B and C. The user may, for example, interact with Promotion A, by for example, clicking on a link associated with Promotion A, playing and/or purchasing digital content associated with Promotion A and/or perform any other action indicative of the user's interaction with Promotion A or content featured by Promotion A. The PS 120 may receive a notification and/or request from the electronic device comprising data and/or information regarding the user interactions with any of the personalized digital content promotions.

In operation, a user of an electronic device, such as, for example, the electronic device 110 may interact with a personal digital media library, such as, for example, the PDML 140. The electronic device 110, in response to user interactions (e.g., starting an application that provides access to the digital content of the PDML 140, playing and/or purchasing digital content of the PDML 140) may send a notification and/or request for providing and/or updating digital content promotions to a promotion server, such as, for example, the PS 120. The PS 120 may receive and/or process the notification and/or request. The PS 120 may, in response to the notification and/or request, determine current digital content promotions. The PS 120 may determine and/or assign a personal and a universal score to each of the current digital content promotions and may, based on, for example, the personal and the universal score of the current digital content promotions, determine personalized digital content promotions from the current digital content promotions. The PS 120 may send a notification and/or request to the electronic device 110 for presenting (or containing instructions on how to, for example, retrieve and/or present) the personalized promotions to the user of the electronic device 110. The electronic device 110 may present and/or cause to be presented the personalized digital content promotions to the user of the electronic device 110.

Figure 2:
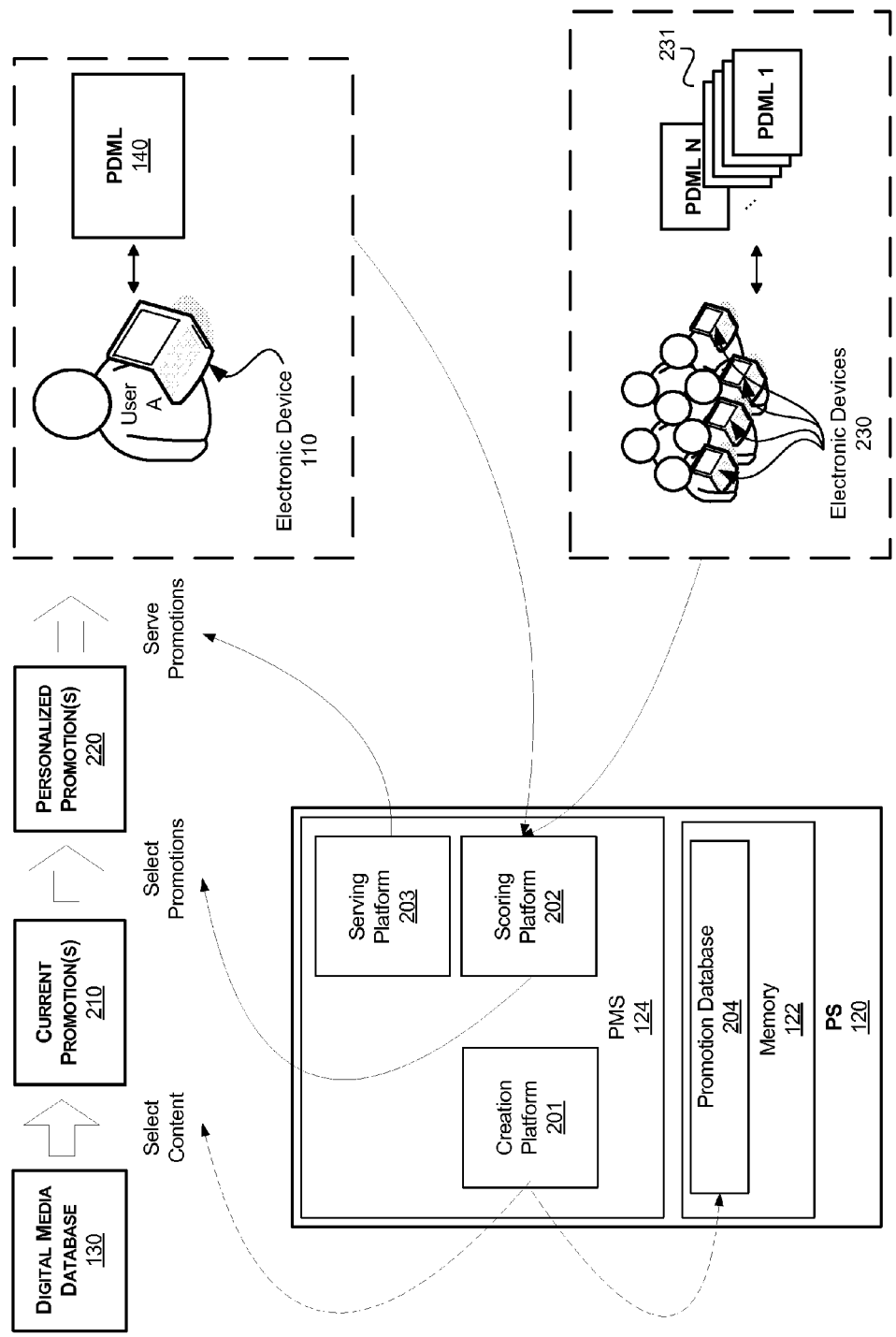
FIG. 2 is block diagram of an example process of creating, scoring and/or serving a media library personalized promotion by a promotion server to a user of an electronic device, in accordance with an example embodiment of the disclosure.

FIG. 2 is block diagram of an example process of creating, scoring and/or serving a media library personalized promotion by a promotion server to a user of an electronic device. Referring to FIG. 2, there is shown an example process of creating, scoring and/or serving a media library personalized promotion by the PS 120 to a user of an electronic device, such as the electronic device 110.

The PMS 124 may comprise a creation platform 201, a scoring platform 202 and/or a serving platform 203. The creation platform 201 may comprise suitable logic, circuitry, code, and/or interfaces that may be operable to create, process and/or manage digital content promotions. In an example embodiment of the disclosure, the creation platform 201 may be operable to accept user input for creating, managing and/or updating digital media content promotions. For example, the creation platform 201 may be operable to accept and/or process data and/or information relating to digital content promotions, such as, for example, digital content for promoting (or selection and/or indication of such content), promotion category, duration, priority and/or graphical (audio, video and/or still image) representation.

The scoring platform 202 may comprise suitable logic, circuitry, code, and/or interfaces that may be operable to match digital content promotions with personal digital media libraries, such as, for example, the PDML 140. The scoring platform 202 may be operable to determine and/or assign a universal score to each of the digital content promotions. The scoring platform 202 may be operable to assign a personal score to each of the digital content promotions for a particular personal digital media library, such as, for example, the PDML 140.

In an example implementation of the disclosure, the scoring platform 202 may be operable to determine, calculate, update and/or manage personal and universal scores for current digital content promotions. The personal score for each of the current digital content promotions may be calculated based on the contents (e.g. PDMIs 142) of a personal digital media library, such as, for example, the PDML 140.

The scoring platform 202 may be operable to receive and/or process requests from the PS 120 to determine a personal and/or a universal score of a current promotion.

With respect to determining a personal score of the current promotion, the scoring platform 202 may identify the digital content (e.g., the DMIs 132 from the Digital Media Library 130) corresponding to the current digital content promotion. In an example embodiment of the disclosure, the scoring platform 202 may compare the PDMIs 142 from the PDML 140 with the DMIs 132 corresponding to the current digital content promotion. The scoring platform may determine a personal score for the current promotion based on the comparison for the PDMIs 142 with the DMIs 132 corresponding to the current promotion (promotional DMIs). The personal score may be based on, for example, how closely the PDMIs 142 correspond to the promotional DMIs, using for example a correlations scoring, as described with respect to the Digital Media Library 130 depicted in FIG. 1. The personal score may also be based on, for example, a size of a group of PDMIs 142 corresponding to the promotional DMIs. For example, when the promotional DMIs correspond to a certain genre and most of the PDMIs 142 also corresponds to the same or a closely related genre the personal score for the current promotion may be very high. If, for example, digital content 1 and digital content 2 corresponding to Promotion 1 and Promotion 2, respectively, correspond closely to the PDMIs 142 in the PDML 140, but the digital content 1 corresponds to a greater number of PDMIs 142 than digital content 2, then Promotion 1 may receive a higher personal score relative to Promotion 2.

In another example of the disclosure, the scoring platform 202 may perform a mapping of the PDMIs 142 of the PDML 140 onto DMIs 132 of the Digital Media Library 130 to obtain mapped DMIs 132. The scoring platform may then compare the mapped DMIs with the promotional DMIs (such as the promotional DMIs described above). The scoring platform may be operable to determine the PDMIs 142 from the PDML 140 and may compare each of the PDMIs 142 with DMIs 132 from the Digital Media Database 130. For example, the scoring platform may determine that PDMI_1 corresponds to a DMI_35, PDMI_2 corresponds to DMI_356 etc. The mapping may be performed using a variety of comparison algorithms, such as, for example, metadata information text comparisons, and/or audio/video sampling comparisons. The scoring platform may then determine a correlations score assigned to each of the promotional DMIs with respect to each of the mapped DMIs. The scoring platform 202 may request the correlations score from the Digital Media Database 130 which stores, manages and/or updates such correlations scores as described with respect to FIG. 1.

In an example embodiment of the disclosure, the scoring platform 202 may receive a request to re-score a current digital content promotion based on user interactions with the current digital content promotion. The request to re-score may be received from, for example, the serving platform 203, the PS 120 and/or the electronic device 110. For example, after the current digital content promotion has been presented to the user of an electronic device, such as, for example, the electronic device 110, the user may interact with the current digital content promotion by clicking and/or otherwise selecting the current digital content promotion, by purchasing and/or playing digital content associated with the current digital content promotion. In this regard, the scoring platform 202, may adjust the personal score of the current digital content promotion so as to reflect the user interaction. The personal score may be adjusted up or down depending on the type of user interactions. If for example, the user purchased content associated with the current digital content promotion, the personal score for that particular current digital content promotion may be adjusted down and in result may, for example, not be presented to the user in the future.

With respect to determining a universal score of the current promotions, the scoring platform 202 may identify the digital content (e.g., the DMIs 132 from the Digital Media Library 130) corresponding to the current digital content promotion. The scoring platform 202 may determine the universal score based on, for example, popularity, play and/or purchase history and/or user interactions with the digital content and/or the current digital content promotion corresponding to the digital content. For example, the universal score may be high for a promotion corresponding to digital content that is a part of a relatively large number of personal digital media libraries determined from, for example, the plurality of personal digital media libraries 231. In another example, the universal score may be based on how many times a particular current promotion has been interacted with and/or how many digital content purchases resulted from such interactions.

The personal and/or the universal score may be determined in isolation for individual digital content promotions and/or relative to other digital content promotions. For example, the personal and/or the universal score may be determined for each digital content promotion individually based on one or more criteria as described in the present disclosure. In another example, the personal and/or universal score may be determined relative to other digital content promotions. In this regard, a subset of digital content promotions may be chosen and the personal and/or universal score for each of the promotions in the subset may be determined so as to obtain a ranking of the promotions in the subset relative with each other. For example, if the subset comprises Promotions 1-5, the result reflecting an ordering from the highest to the lowest ranking promotion might be, for example as follows: Promotion 4, 2, 3, 5, 1. The ranking may be based on the personal score alone, on the universal score alone and/or on an aggregate score (personal and universal score for each of the promotions). The ranking may also be based on one of the personal and the universal score for some promotions and/or an aggregate score for other promotions. For example, Promotions 4, 2, 3 may have, respectively, the first, second and third highest personal score and Promotions 5 and 1 may have the fourth highest personal score. Promotion 5 may have a higher universal score than Promotion 1 and hence a higher aggregate score than Promotion 1. The aggregate score may be used to determine the ranking of Promotion 1 with respect to Promotion 5, so as to obtain an overall ranking of the promotions from highest to lowest scoring to be as follows: Promotion 4, 2, 3, 5, 1.

In an example embodiment of the disclosure, the scoring platform 202 may exclude certain current digital content promotions from scoring, based on, for example, pre-defined promotion criteria associated with the current digital content promotions. The scoring platform 202 may obtain such criteria by, for example, accessing the promotion database 204. In this regard, the criteria may specify a minimum number of PDMIs 142 of a certain category (e.g., artist, genre) that may have to be a part of the PDML 140 before a particular digital content promotion may be scored (and/or later presented to the user). If, for example, the criteria is not met, the scoring platform may assign a personal score of 0 (or a very low relative score) so as to prevent the particular digital content promotions to be presented to the user by the serving platform 203.

It is to be understood that the scoring mechanisms described herein are only example scoring mechanisms and may be modified to obtain other scoring mechanisms suitable for determining a personal and/or universal score for a digital content promotion that is reflective and/or based on a particular personal digital media library and/or on interactions with a plurality of personal digital media libraries and/or the digital content corresponding to s particular digital content promotion.

The serving platform 203 may comprise suitable logic, circuitry, code, and/or interfaces that may be operable to present the digital content promotions to a user of an electronic device, such as, for example, the electronic device 110. The serving promotion 203 may receive and/or process a request from the PS 120 to present and/or cause to be present to a user of an electronic device, such as, for example, the electronic device 110 personalized digital content promotions. The serving platform may determine a suitable number of personalized promotions that may be present to the user base on, for example, the type of the electronic device 110 on which the personalized promotions are to be presented, the application running on the electronic device 110 that may be utilized for presenting the personalized digital content promotions (e.g., a web browser, media player). In an example embodiment of the disclosure, the number of personalized digital content promotions to be presented to the user may be specified in a request from the electronic device, as received and/or processed by the PS 120 as described herewith.

The serving platform 203 may be operable to send a re-scoring request to the scoring platform 202 based on user interactions with preciously presented digital content promising. The re-scoring request may be sent by the serving platform 203 based on data and/or information received from the electronic device 110 regarding the previously presented promotions and/or any other data and/or information that may necessitates a re-scoring request, such as, for example, play or purchase of the digital content corresponding to a particular digital content promotion.

The memory 122 may comprise a promotion database 204. The promotion database 204 may comprise a plurality of entities, each corresponding to a particular digital content promotion. In this regard each entity may comprise information and/or data, such as, for example, name of the promotion, start and/or end time of the promotion, identification of specific digital content being promoted, a video and/or a still image of the promotion, method of serving the promotion and/or other attributes descriptive of the digital content promotion.

Referring to FIG. 2, there is shown, current digital content promotions 210, personalized digital content promotions 220, a plurality of electronic devices 230 and a plurality of personal digital medial libraries PDMLs 231, one through N (PDML 1, 2, 3 . . . N).

In operation, a user of the PS 120 may create current digital content promotions, such as, for example, the current digital content promotions 210. The user may select digital media content from a digital media database, such as the Digital Media Database 130. The user may define one or more criteria associated with the current digital content promotions 210, such as, for example, name of the promotion, start and/or end time of the promotion, identification of specific digital content being promoted, a video and/or a still image of the promotion, method of serving the promotion and other attributes descriptive of the digital content promotion. The current digital content promotions 210 may be stored and/or managed by the Promotion Database 204.

In an example embodiment of the disclosure, the electronic device 110 may send a notification and/or request to the PS 120 to send to the electronic device 110 personalized digital content promotions, such as, for example, the personalized digital content promotions 220. The PS 120, in response to the notification and/or request, may send a request to the promotion database, such as, for example, the promotion database 204 for a determination of current digital content promotions, such as, for example, the current digital content promotions 210. The promotion database 204 may determine the current digital content promotions 210 based on, for example, the time and date of the notification and/or request received from the electronic device 110.

The PS 120 may send a request to the scoring platform 202 to score the current digital content promotions 210 by assigning a personal and/or a universal score to each of the current digital content promotions 210. The scoring platform 202 may receive and/or process the request to score the current digital content promotions 210 and may determine personalized digital content promotions, such as, for example, the personalized digital content promotions 220 based on the scoring. The scoring platform 202 may access the promotion database 204 in order to retrieve the current digital content promotions 210 and/or any data and/or information relating thereto. The scoring platform 202 may send data and/or information regarding the personalized digital content promotions 220 to the serving platform 203 and/or the PS 120 for further processing.

The PS 120 may send a request to the serving platform 203 to serve the personalized digital content promotions 220 to the user of the electronic device 110. The serving platform 203 may receive and/or process the request and may facilitate presenting the current digital content promotions 220 to the user. In this regard, the serving platform 203 may send to the electronic device 110 the personalized digital content promotions 220, identification of and/or instructions on how to retrieve the personalized digital content promotions 220 for presentment on the electronic device 110.

The electronic device may revive and/or process a request from the serving platform 203 to present the personalized promotions 220 to the user. The electronic device 110 may determine and/or use a pre-determined method of presentment of the personalized digital content promotions 220, through, for example, a graphical user interface and/or an application running on the electronic device 110 (e.g., web-browser, media player).

Figure 3:
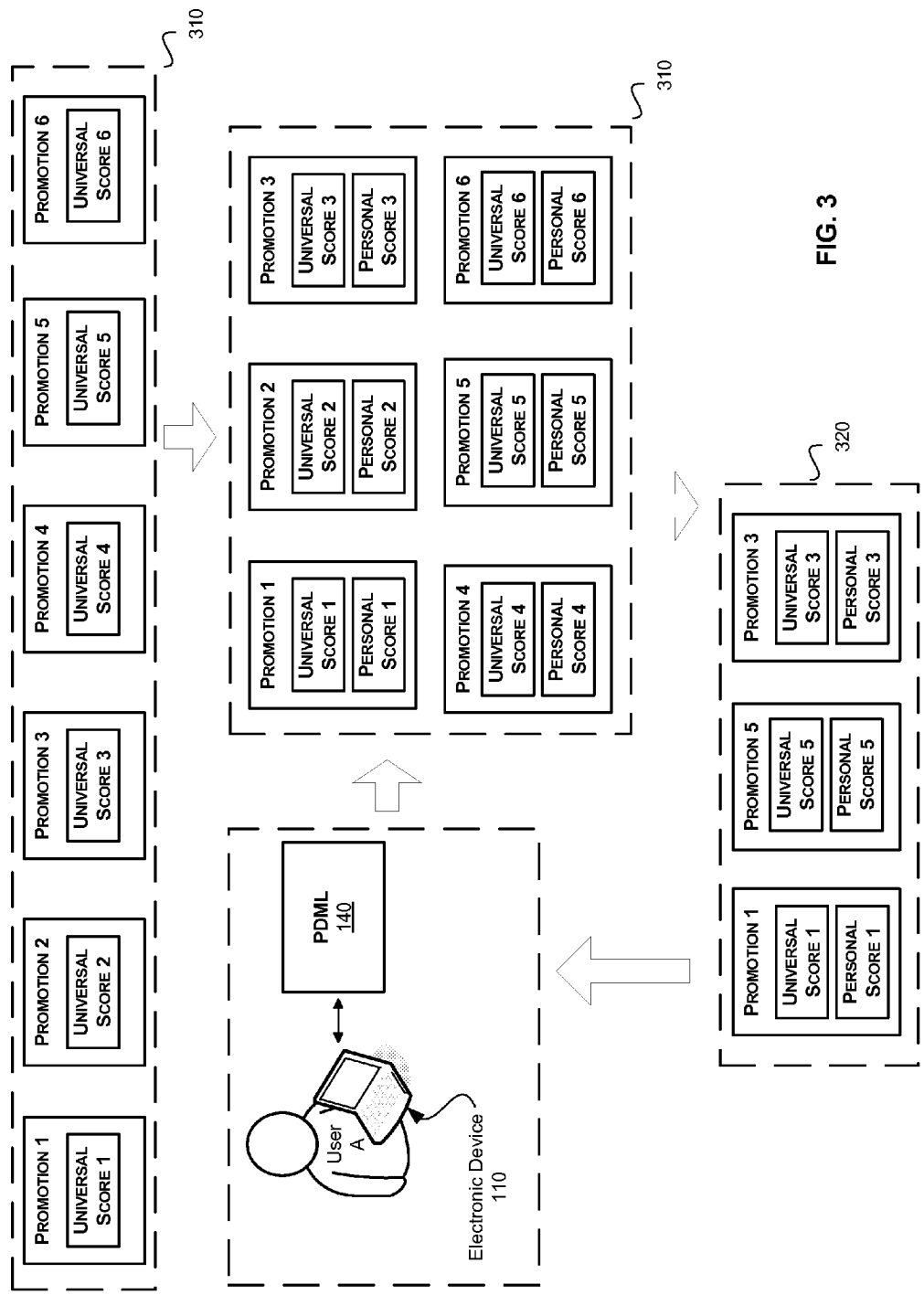
FIG. 3 is a block diagram of an example process of scoring and/or serving a media library personalized promotion by a promotion management system to a user of an electronic device, in accordance with an example embodiment of the disclosure.

FIG. 3 is a block diagram of an example process of scoring and/or serving a media library personalized promotion by a promotion management system to a user of an electronic device. Referring to FIG. 3, there is shown, a plurality of current digital content promotions 310, a plurality of personalized digital content promotions 320, and/or a process of scoring, selecting and/or presenting the personalized digital content promotions from the current digital content promotions.

In operation, when a user of an electronic device, such as, for example, the electronic device 110, interacts with a personal digital media library, such as, for example, the PDML 140, a promotion server, such as, for example, the PS 120 may receive a request from the electronic device 110 to send to the electronic device personalized digital content promotions based on the PDML 140. The PS 120 may determine a planarity of current promotions, such as, for example, the plurality of current promotions 310 and may determine a universal score associated with each of the current digital content promotions. The PS 120 may request and/or receive from the electronic device 110 data and/or information regarding the PDML 140, such as for example, a list, identification of, play and/or purchase history of digital content (e.g., PDMIs 142). The PS 120 may determine a personal score for each of the plurality of current digital content promotions 310 based on the data and/or information. The PS 120 may determine a plurality of personalized digital content promotions, such as, for example, the plurality of personalized digital content promotions 320 from the plurality of current digital content promotions 310 based on the personal score, the universal score and/or a combination thereof.

In an example embodiment of the disclosure, the PS 120 may determine the plurality of personalized digital content promotions 130 based on the personal score alone. For example, Promotion 1, 5 and 3 may have the three highest personal scores, respectively. The PS 120 may determine Promotion 1, 5 and 3 as the plurality of personalized digital content promotions 320.

In another example embodiment of the disclosure, the PS 120 may determine the plurality of personalized digital content promotions 320 based on the personal score of some promotions and/or an aggregate score (personal and/universal score) of other promotions. For example, Promotion 1 may have the highest personal score, Promotion 5 may have the second highest personal score and Promotion 3 and 6 may both have the third highest personal score. The PS 120 may determine that Promotion 3 has a higher universal score than Promotion 6 and as a result Promotion 3 has a higher aggregate score than Promotion 6. The PS 120 may determine Promotion 1, 5 and 3 as the plurality of personalized digital content promotions 320.

In yet an example embodiment of the disclosure, the PS 120 may determine the plurality of personalized digital content promotions 320 based on the an aggregate score (personal and/universal score combined) of each of the plurality of current digital content promotions 310. For example, Promotion 1, 5 and 3 may have the three highest aggregate scores, respectively. The PS 120 may determine Promotion 1, 5 and 3 as the plurality of personalized digital content promotions 320.

The PS 120 may send the plurality of personalized digital content promotions 320 (or a representation, identification and/or instructions on how to retrieve the plurality of personalized digital content promotions 320) to the electronic device 110. The electronic device 110 may receive the plurality of personalized digital content promotions 320 (or a representation, identification and/or instructions on how to retrieve the plurality of personalized digital content promotions 320) and may present the personalized digital content promotions 320 to the user of the electronic device 110 as part of, for example, a graphical user interface of an application running on the electronic device, such as, for example, an application incorporating and/or providing access to the PDML 140.

Figure 4:
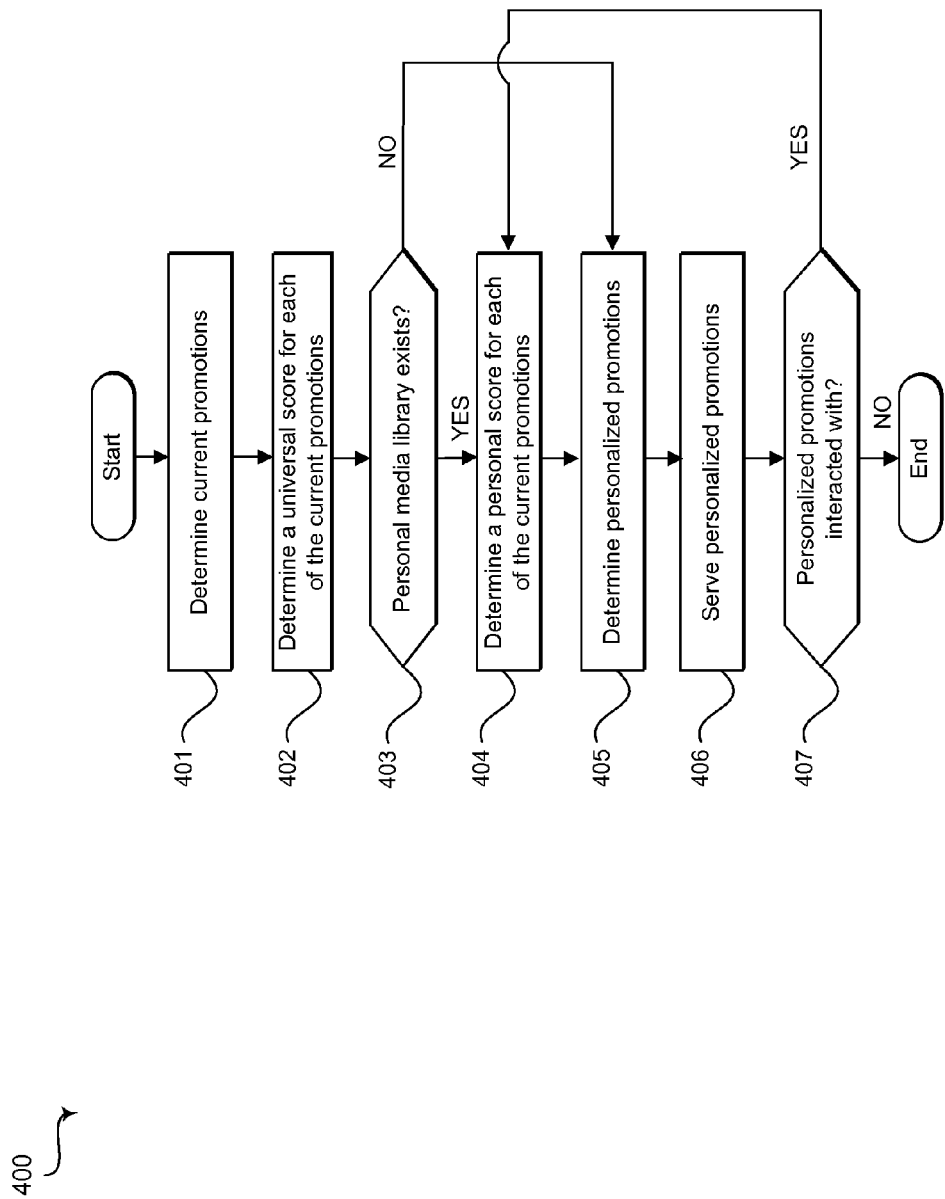
FIG. 4 is a flow diagram of example steps of a method for managing media library merchandising promotions, in accordance with an example embodiment of the disclosure.

FIG. 4 is a flow diagram of example steps of a method for serving media library merchandising promotions. Referring to FIG. 4, an example method 400 is shown comprising a plurality of example steps for serving media library merchandising promotions.

In example step 401, current promotions are determined. In this regard when the PS 120 receives a notification and/or request from an electronic device, such as, for example, the electronic device 110, to determine personalized digital content promotions, the PS 120 may determine current promotions from all available promotions. The PS 120 may initiate a search in a promotion database, such as, for example, the promotion database 204. The search may be based on, for example, the date and time of the notification (and/or the request) and/or a type of the electronic device 110.

In example step 402, a universal score may be determined for each of the current promotions determined in the example step 401. In this regard, the PS 120 may initiate a search in the promotion database 204 to determine a universal score assigned to each of the current promotions. In en example embodiment of the disclosure, the PS 120 may determine that one or more of the current promotions have a missing and/or outdated universal score. For example, a universal score may have not previously been assigned to a current promotion and/or the universal score may have been assigned to the current promotion at a time falling outside of a predetermined maximum time permitted to elapse between the time when the universal score was assigned and the time when the universal score is retrieved from the promotion database. In this regard, the PS 120 may request from the scoring platform 202 to determine a new and/or updated universal score for a current promotions. The PS 120 may receive a confirmation from the 202 that the universal score was determined and/or updated.

In example step 403, a determination may be made whether a personal digital media library has any contents. The notification and/or request received by the PS 120 in step 401 may comprise data and/or information identifying a particular personal digital media library, such as, for example PDML 140. In an example embodiment of the disclosure, the PS 120 may determine if the PDML 140 contains any digital media contents such as, for example, PDMI 141 and/or a plurality of PDMIs 142. If the PDML 140 contains any digital media contents, the example steps continue at the example step 404. If the PDML 140 contains any digital media contents, the example steps continue at the example step 405.

In example step 404, a personal score may be determined for each of the current promotions. In this regard the PS 120 may request from the scoring platform 202 to determine a personal score for each of the current promotions, wherein the personal score may be in part based on, for example, the contents of the PDML 140, any interaction with the personalized digital content promotions though the PDML 140, play, access and/or purchase history of the PDMIs 142 and/or any other information indicative of a relationship.

In example step 405, personalized digital content promotions may be determined. In this regard the PS 120 may determine how many current promotions may be presented to a user of the electronic device 110 as personalized digital content promotions. The number of current promotions that may be presented to the user may be determined based on, for example, the type of the electronic device 110, the data and/or information about the PDML 140 (e.g., contents (PDMIs 142), play, access and/or purchase history of the PDMIs 142), a set of pre-defined promotion criteria (e.g., a management decision to promote three most appropriate promotions for every personal digital medial library, a pre-defined limit of promotions that are directed to similar content). The PS 120 may prioritize the current promotions based on the personal score. For example, if the desired number of the current promotions to be presented to the user is three, the PS 120 may select three personalized digital content promotions from the current promotions with highest personal scores. In an example embodiment of the disclosure, there may be more than, for example, three, current promotions with highest scores. For example, "Promotion 1" may have a personal score of 25, "Promotion 2," "Promotion 7" and "Promotion 14" may each have a personal score of 20. The PS 120 may determine a universal score for each of the "Promotion 2," "Promotion 7" and "Promotion 14" in order to arbitrate which two promotions out of the "Promotion 2," "Promotion 7" and "Promotion 14" may be presented to the user. For example, "Promotion 2," "Promotion 7" and "Promotion 14" may have a universal score of 15, 29 and 7, respectively, the PS 120 may determine that the personalized digital content promotions comprise "Promotion 1," "Promotion 2" and "Promotion 7."

In example step 406, the personalized digital content promotions may be served. In this regard, the PS 120 may send a notification and/or request to the electronic device 110 to present the personalized digital content promotions to the user of the electronic device 110. For example, the notification and/or request may comprise the personalized digital content promotions and/or data and/or information identifying the personalized digital content promotions so as to allow the electronic device 110 to present the personalized digital content promotions to the user. For example, the electronic device 110 may receive and/or process the notification and/or request from the PS 120. The electronic device 110 may send a request to the PDML 140 and/or cause the PDML 140 to present the personalized digital content promotions to the user when the user is, for example, interacting with the PDML 140 on or through the electronic device 110.

In example step 407, a determination may be made whether personalized digital content promotions were interacted with. In this regard the electronic device 110 may send a notification and/or request to the PS 120 may the user interact with one or more of the personalized digital content promotions, by for example, clicking and/or selecting one or more of the personalized digital content promotions and/or by purchasing content to which one or more of the personalized digital content promotions is directed. If one or more personalized digital content promotions were interacted with, the example steps return to the example step 404. If none of the personalized digital content promotions was interacted with, then the example steps end at the example step 407.

It is to be understood that any time contents (e.g., a DMI, a digital content promotion) are sent, received, stored and/or processed as described herein, the contents may comprise the contents themselves (e.g., the actual digital media file corresponding to a particular piece of content and/or promotion being sent, received, stored and/or processed), pointers to the contents (e.g., identifies, IDs and/or pointers to an entity and/or item in, for example a database and/or a storage location corresponding to the particular piece of content and/or promotion being sent, received, stored and/or processed), a text file representative of the contents, a list of the contents and/or any other form that may allow a promotion server system, such as for example, the promotion server 120, and/or an electronic device, such as, for example, the electronic device 110 to identify, determine and/or process the contents accordingly.

Other implementations may provide a computer readable medium and/or storage medium, and/or a machine readable medium and/or storage medium, having stored thereon, a machine code and/or a computer program having at least one code section executable by a machine and/or a computer, thereby causing the machine and/or computer to perform the steps as described herein for managing media library merchandising promotions.

Accordingly, the present method and/or system may be realized in hardware, software, or a combination of hardware and software. The present method and/or system may be realized in a centralized fashion in at least one computing system, or in a distributed fashion where different elements are spread across several interconnected computing systems. Any kind of computing system or other system adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method, comprising:
   in a server:
   determining one or more current promotions from a plurality of promotions for at least one digital media item;
   determining a number of personal digital libraries in which the at least one digital media item is present, each of the personal digital libraries belonging to one of a plurality of users;
   assigning a universal score to each of the one or more current promotions, wherein the universal score is determined based on the number of personal digital libraries;
   assigning a personal score, corresponding to a particular user not in the plurality of users, to each of the one or more current promotions, wherein the personal score is updated dynamically based on interactions with the one or more current promotions for the at least one digital media item by the particular user and a correlation between the at least one digital media item and digital media items in a personal digital media library of the particular user;
   determining, for the particular user, personalized digital content promotions from the current promotions, the determined personalized digital content promotions first being prioritized based on the assigned personal score;
   selecting a portion of the prioritized personalized digital content promotions based on the assigned universal score of the one or more current promotions; and
   transmitting information regarding the selected portion of the personalized digital content promotions to an electronic device associated with the particular user.

2. The method according to claim 1, wherein determining personalized digital content promotions is based on the personal score of at least some of the one or more current promotions.

3. The method according to claim 1, wherein determining personalized digital content promotions is based on the personal score of at least some of the one or more current promotions and on the universal score of at least some of the one or more current promotions.

4. The method according to claim 1, comprising determining popularity of one or more digital media items associated with each of the one or more current promotions, wherein the assigning of the universal score is based on the popularity of the one or more digital media items.

5. The method according to claim 1, comprising:
   grouping personal digital media items associated with a personal media library based on a category of one or more digital media items associated with at least some of the one or more current promotions to obtain one or more groups, wherein the personal media library is associated with the particular user; and
   determining the size of each of the one or more groups, wherein the assigning of the personal score for each of the one or more current promotions is based at least on the size of at least some of the one or more groups.

6. The method according to claim 1, wherein the interactions by the particular user comprise purchasing, by the particular user, digital content associated with the one or more current promotions.

7. The method according to claim 2, wherein the personal score is based on the particular user's activity with respect to a personal media library, wherein the personal media library is associated with the particular user.

8. A method, comprising:
   in a server:
   determining one or more current promotions from a plurality of promotions for at least one digital media item;
   determine a number of personal digital libraries in which the at least one digital media item is present, each of the personal digital libraries belonging to one of a plurality of users;
   assigning a universal score to each of the one or more current promotions, wherein the assigning of the universal score is based on the popularity of the one or more digital media items and the number of personal digital libraries associated with the one or more current promotions by one or more users;
   assigning, a personal score, corresponding to a particular user not in the plurality of users, to each of the one or more current promotions, wherein the personal score is updated dynamically based on interactions with the one or more current promotions for the at least one digital media item by the particular user and a correlation between the at least one digital media item and digital media items in a personal digital media library of the particular user;

determining, for the particular user, personalized digital content promotions from the current promotions based on the personal score of at least some of the one or more current promotions, the personalized digital content promotions are determined as a result of aggregating the personal score and the universal score to produce an aggregate score for the one or more current promotions;

selecting a portion of the personalized digital content promotions based on the aggregated score for the one or more current promotions; and transmitting information regarding the selected portion of the personalized digital content promotions to an electronic device associated with the particular user.

9. The method according to claim 8, comprising:

matching one or more digital media items associated with at least some of the one or more current promotions with one or more personal digital media items associated with a personal media library, wherein the personal media library is associated with the particular user; and assigning a correlation score to each of the one or more digital media items associated with at least some of the one or more current promotions matched to the one or more personal digital media items, wherein the assigning of the personal score for each of the one or more current promotions is based on the correlation score.

10. A system comprising:

one or more processors, the one or more processors being operable to:

determine one or more current promotions from a plurality of promotions for at least one digital media item;

determine a number of personal digital libraries in which the at least one digital media item is present, each of the personal digital libraries belonging to one of a plurality of users;

assign a universal score to each of the one or more current promotions, wherein the universal score is determined based on the number of personal digital libraries and from combinations of one or more of a popularity, a play history, a purchase history, or interactions with of one or more digital media items associated with each of the one or more current promotions;

assign a personal score, corresponding to a particular user not in the plurality of users, to each of the one or more current promotions, wherein the personal score is updated dynamically based on interactions with the one or more current promotions for the at least one digital media item by the particular user and a correlation between the at least one digital media item and digital media items in a personal digital media library of the particular user;

determine, for the particular user, personalized digital content promotions from the current promotions, the personalized digital content promotions are determined as a result of aggregating the personal score and the universal score to produce an aggregate score for the one or more current promotions;

selecting a portion of the personalized digital content promotions based on the aggregated score for the one or more current promotions; and transmit information regarding the selected portion of the personalized digital content promotions to an electronic device associated with the particular user.

11. The system according to claim 10, wherein determining personalized digital content promotions is based on the personal score of at least some of the one or more current promotions.

12. The system according to claim 10, wherein determining personalized digital content promotions is based on the personal score of at least some of the one or more current promotions and on the universal score of at least some of the one or more current promotions.

13. The system according to claim 10, wherein the one or more processors are further operable to:

group personal digital media items associated with a personal media library based on a category of one or more digital media items associated with at least some of the one or more current promotions to obtain one or more groups, wherein the personal media library is associated with the particular user; and determine the size of each of the one or more groups, wherein the assigning of the personal score for each of the one or more current promotions is based at least on the size of at least some of the one or more groups.

14. The system according to claim 10, wherein the interactions by the particular user comprise purchasing, by the particular user, digital content associated with the one or more current promotions.

15. The system according claim 11, wherein the personal score is based on the particular user's activity with respect to a personal media library, wherein the personal media library is associated with the particular user.

* * * * *